Patented July 25, 1933

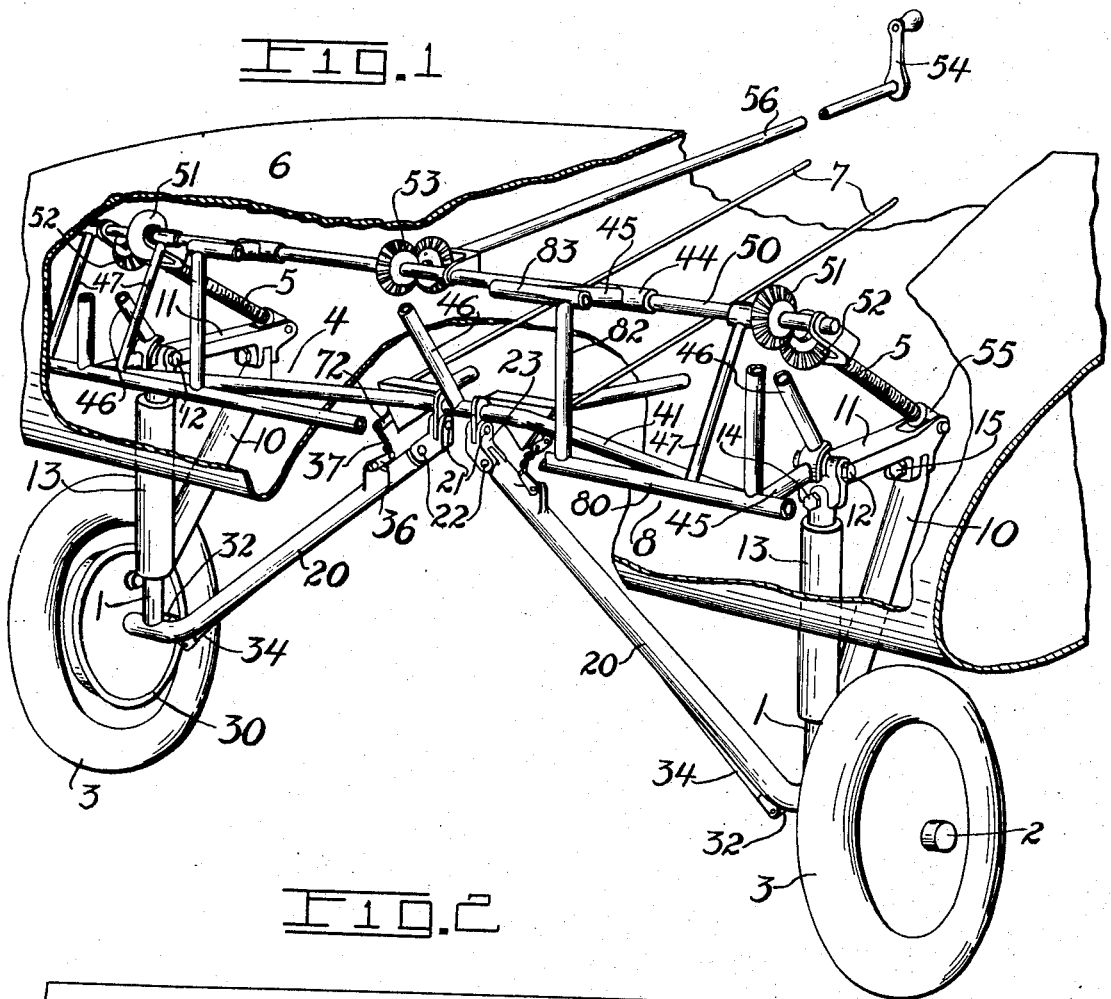

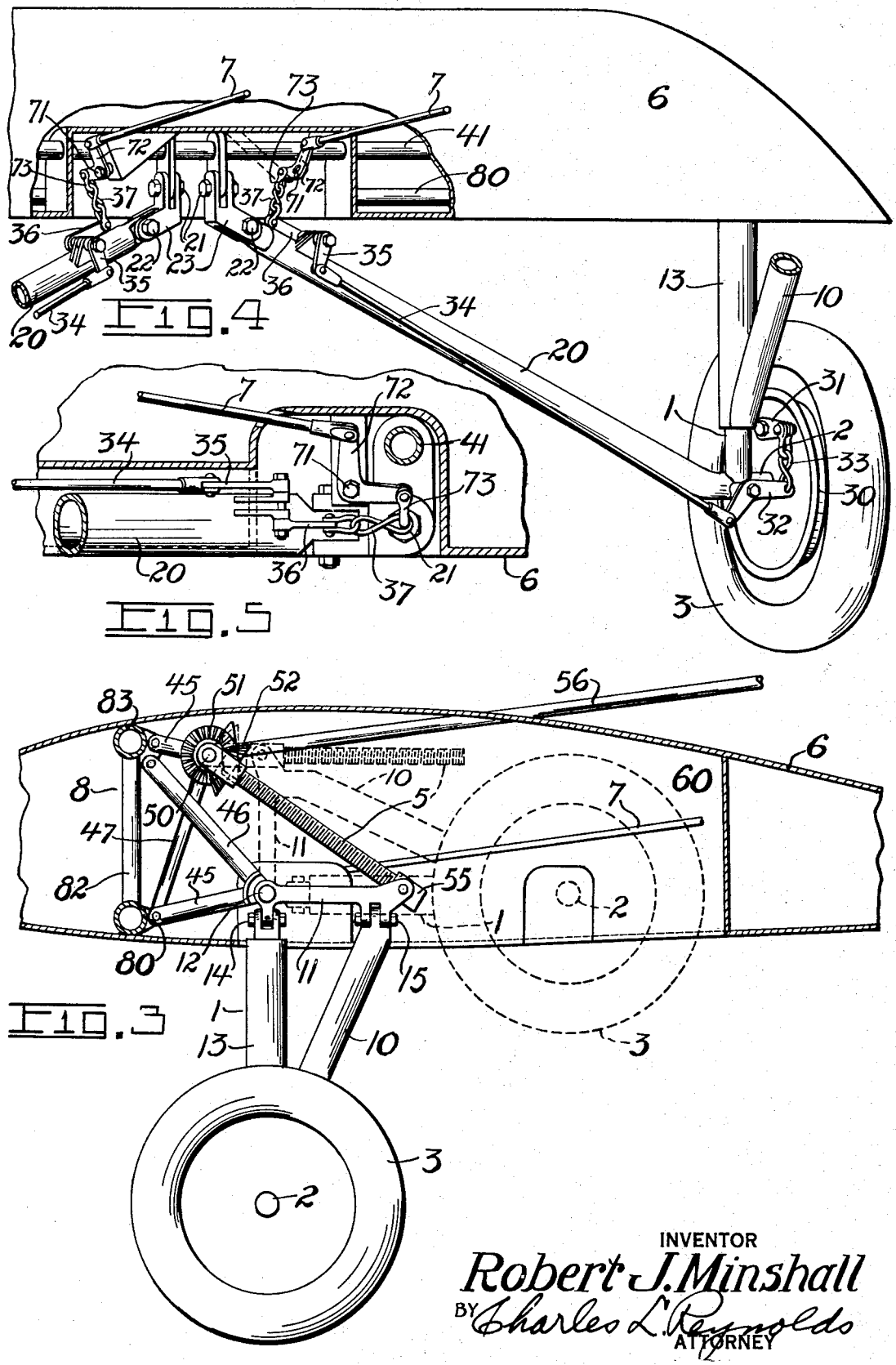

1,919,524

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON, A CORPORATION OF WASHINGTON

RETRACTABLE LANDING GEAR

Application filed April 7, 1931. Serial No. 528,303.

My invention relates to airplanes, and has as its particular object the provision of means whereby a landing gear may be retracted within streamlined parts of the airplane, for instance the aerofoils or the fuselage, and whereby such landing gear, when projected into operative position, shall be strongly supported from the framework of the airplane, yet flexible to permit its yielding under the shocks of ordinary landings, and even the shocks and distortion of landing upon rough fields, and which may have incorporated therein shock absorbing means, as is customary in landing gears. In other words, it is my object to provide a landing gear which is as thoroughly practical under all conditions as any now in common use, yet to make such landing gear retractable while in flight, to the end that its drag will be eliminated when in flight and the performance of the airplane improved, and of course, one which is projectible while in flight, in anticipation of a landing.

It is also a major object to provide a retractable landing gear with which can be employed the brakes so necessary, and which can be operated for retraction or projection without in any way disturbing the connections of the brake rods to the brake pedals or to the brake drums.

It is also an object to provide a retractable landing gear of the general character described which can be assembled as a unit and then applied to a major frame member of the airplane, as for instance, the wing spar, to support the landing gear in operative position, and to transmit the stresses directly to such major frame member.

Other objects, and particularly such as refer more especially to the mechanical details of my invention, will be best ascertained from a study of the accompanying drawings, wherein my invention is shown in a form at present preferred by me, and of this specification and the claims which terminate the same.

Figure 1 is a perspective view of the landing gear, associated with an aerofoil, parts being broken away and others omitted to show the interior construction and manner of support.

Figure 2 is an underside plan view of an aerofoil, showing my landing gear associated therewith and in retracted position.

Figure 3 is a transverse section on the line 3—3 of Figure 2 through such an aerofoil, showing my landing gear incorporated therein and in operative of projected position, and illustrating how the same may be retracted.

Figure 4 is a perspective view taken from the rear of the aerofoil, showing my landing gear associated therewith, parts being broken away and shown in section.

Figure 5 is a section substantially on the line 5—5 of Figure 2, showing parts in the retracted position.

In common with other landing gears now in use, my landing gear involves a V-strut consisting of the forward strut 1 and the rear strut 10, the latter inclined upwardly and rearwardly on the lower end of the strut 1, and the two struts, 1 and 10, being connected at their lower end to an axle 2. The axle is of the split type, extending angularly upwardly and inwardly from the landing wheel 3, as is indicated at 20, toward the inner end of the other half of the split axle at the opposite side of the medial longitudinal plane of the airplane, that is, to a point adjacent the center line of the craft. Each half of the landing gear is independent of the other half. If one half is damaged in landing, it may be replaced without disturbing the undamaged half. However, they are connected for retraction and projection by a common operating means.

The upper ends of the struts 1 and 10 are held in rigidly spaced relationship by a spacer bar 11. This spacer bar is supported by a pivot pin 12, the axis of which extends horizontally and transversely of the airplane, so that the entire V-strut and its spacer bar may swing from the downwardly projecting operating position of Figure 1 upwardly into the retracted position shown in Figure 2, and illustrated in dotted lines in Figure 5. The means for accomplishing this may take various forms and will be described later.

At their upper inner ends, each half 20 of the split axle is provided with a pivot support 21 upon a horizontal transverse axis, which is substantially in alignment with the axis of the pivot pin 12. Thus there are in alignment the pins 12 and the pins 21 for the two halves of the landing gear. The two halves are constructed independently, as has been stated, and are so assembled as to permit a certain amount of flexibility and yielding relative to each other, and in their component parts. This is permitted chiefly because the V-strut, particularly the strut 1, has incorporated in it a shock absorbing unit 13, which may be of any suitable type. For instance, the shock absorber may be of the oleo type and the piston may be connected to the axle adjacent the wheel. To permit this yielding, the upper end of the forward strut 1 is pivoted upon a horizontal longitudinal pivot pin 14, which is aligned with a similar pin 15 which connects the upper end of the rear strut 10 to the spacer bar 11, and the inner end of the axle 20 is pivotally connected at 22 to an angled piece 23 which in turn is connected by the pivots 21 heretofore described to a rigid supporting frame member.

It is convenient to support the landing gear upon a special frame structure, generally designated by the numeral 4, which includes the transverse members 41 and 44, longitudinal spacer members 45, and angular braces 46 and 47. The pivot pins 12 may be supported from this framework 4, as may also the members 23 with their pivots 21.

The employement of such a framework, on which the landing gear is supported, and in which may be supported the operating means therefor, as will be hereafter described, permits assembly of the retractable gear complete, and it may then be secured in the airplane. The particular element which supports it is immaterial, but it should be some major part of the airplane. For instance, in an amphibian plane it might be the pontoons or the stubs supporting the same. In the present instance a low-wing monoplane is illustrated, and the wing spar extends through from one side of the fuselage to the other. To this the framework 4 may be secured. The wing spar 8, as illustrated, comprises the transverse members 80 and 83 and the vertical spacers 82, and securing members are provided for securing framework parts thereto, as may be seen in Figure 3. Thus shocks are transmitted directly from the landing gear to the wing spar, and the support is most direct, rigid, and requires the least strengthening and weight of metal.

Supported in a transverse member 44 of such framework is a shaft 50, carrying a bevel gear 51 meshing with a bevel gear 52, the latter of which is fixed upon one end of a screw 5. The other end of the screw is received in the nut 55 which is secured in the spacer bar 11. By rotating the shaft 50, the screw is rotated in its nut, and the rear end of the spacer bar 11 is brought upwardly and forwardly, swinging the entire landing gear about the pivot pins 12 and 21, and withdrawing the landing wheels 3 upwardly. Such rotation of the shaft may be caused in any convenient manner by the pilot, and as illustrative of a means which may be employed I have shown the pair of bevel gears 53, which are turned by a crank 54, within reach of the pilot, upon the end of a shaft 56 extending from the pilot's compartment forwardly, or rearwardly, as the case may be, to the bevel gears 53.

It will be understood that the parts of the landing gear referred to are duplicated at opposite sides of the medial plane of the airplane, and in order to secure simultaneous actuation of the landing gear members at each side, it is only necessary that the shaft 50 be connected by the means described, or other suitable means, to each of the screws 5.

It is essential that airplanes, especially large heavy planes, be equipped with brakes, and it has heretofore been a problem to employ brakes and mechanical connections from the pilot's cockpit or cabin to the wheels upon any retractable landing gear without the necessity of disconnecting or adjusting parts upon retracting the landing gear, or projecting it again, which is obviously impractical, yet mechanical brakes are most satisfactory because least liable to get out of order. In the present construction the brake drums are illustrated at 30, and the brakes are applied by pulling upon a lever 31 associated with each brake drum. Pivotally supported upon the axle 2 is a lever 32 connected to the brake arm 31 by a link connection illustrated at 33. The opposite end of the lever 32 is connected by a brake rod 34, which extends alongside the axle member 20, to a connection with an arm 35 upon the upper end of the member 20. This arm 35, in effect, is one arm of a lever, the opposite arm 36 of which is connected by links 37 to a clevis 73 depending from one arm of a bell-crank lever 72 pivoted at 71 upon a fixed member of the airplane structure, and to the other arm of which lever 72 there is connected a rod 7 extending rearwardly to a suitable operating lever or pedal under the control of the pilot. Usually the brakes are controlled by tilting of the pedals which control the rudder, and obviously it would not be practical to employ any connection thereto which in flight would cause the pedals to assume an unnatural position. This is another reason why movement of the brake-operating means must not be permitted on account of retraction.

The connection between the link 37 and the clevis 73 lies in an extension of the axis of the pivot pins 21, on which the axle 20, 2 is swung, and which axis also includes the pivot pins 12. In consequence, as may be seen by comparison of Figures 4 and 5, as the landing gear swings on the pins 12 and 21, there is no change of relationship between the link 37 and the clevis 73, except that the link swings through 90° about the eye of the clevis. There is no additional strain or tendency to extension or contraction of either the rod 7 or the rod 34. There is no tendency to set the brake or to slacken it from the position in which it was left, caused by the retraction or the subsequent projection of the landing gear. There is no movement of the pedals to disturb the pilot's control of the rudder. In consequence, the pilot need give no thought to the brakes during the retraction or the projection of the gear, or during flight. He knows that whenever the gear is sufficiently projected he may land upon it and may freely use his brakes. He knows that he need not do anything to the brakes in order to permit the retraction of the landing gear. The brakes are always available whenever the landing gear is available, and the control for retraction of the landing gear is greatly simplified and rendered more expeditious in operation.

As shown herein, the aerofoil 6 is provided with a chamber 60 entered from the lower side, into which the landing gear and the wheels may be retracted in whole or partially. The amount of retraction would depend upon the size of the aerofoil and the relative size of the landing gear and wheels. In the arrangement shown, the landing gear itself comes wholly within the pocket 60, while the wheels, as may be seen in dotted lines in Figure 6, project slightly below the lower surface of the aerofoil, but the small portion projecting is itself sufficiently well streamlined that it does not materially affect the performance of the airplane.

Whenever the landing gear is projected, it will function as does the ordinary landing gear. The shock absorber 13 will yield and the V-strut members and axle are sufficiently flexibly connected to each other and to the airplane that they will give effect to this yielding, and will flex. Each landing wheel may yield, and its half of the landing gear may flex independently of the other half, as in the usual split axle construction. Parts are rigidly supported, since the irreversible screw 5 extends angularly upward from its connection to the rear end of the V-strut to a point above the pins 12 where the forward member of the V-strut is pivoted, and there is thus formed a truss which will rigidly maintain the spacer bar in the position to which it has been moved. If parts are sufficiently strongly designed, the landing gear may function even though it is not fully projected, so that the pilot in an emergency may land with the wheels only partially projected if he has not had time to project them fully before landing. Should the pilot find it necessary to land upon water or upon snow, the wheels, being retracted, will not upon striking the water or soft snow cause the plane to nose over, and it may the better land on the water in an upright position where it will have the best chance of floating, or flotation gear or special flotation chambers may be built into or associated with the plane, thus enabling the craft to alight on water after taking off from land, without the provision of pontoons.

It will be noted that the wheel 3 is mounted upon the outer end of the shaft 2, and that there is nothing outside of the wheel, to impede its rotation. To remove a tire it is only necessary to jack up the axle 2, and the tire (or wheel, for that matter) can be removed with ease. A larger sized tire can be put in place, if desired, without adjustment or alteration of any part of the landing gear. This simplifies problems of ordinary servicing.

What I claim as my invention is:—

1. In combination with an airplane structure, a landing gear therefor comprising V-struts disposed in a longitudinal plane at each side of its longitudinal axis, a member to space the upper ends of the V-struts, a landing wheel at the lower end of each V-strut, an axle extending from each landing wheel upwardly and inwardly towards the other axle, means pivotally supporting the upper end of each V-strut from the airplane structure, means pivotally supporting the upper, inner end of each axle from the airplane structure, and means for swinging the wheels, struts and axles upwardly upon said pivot supports from operative position to a retracted position.

2. The combination of claim 1, wherein the pivot supports of the V-struts and of the inner, upper ends of the axle are in axial alignment.

3. The combination of claim 1, the means for swinging the wheels, struts and axles comprising a rigid member adjustable in effective length, and extending from the upper end of the rear strut upwardly and forwardly to a point above the pivot axis of the V-strut, and a member at such point rigidly supporting said rigid member from the airplane structure.

4. The combination of claim 1, the axis of the pivot support of the V-strut lying at the upper end of the forward strut, and the means for swinging the landing gear comprising a screw rigidly and rotatively connected at its forward end, and above the pivot support of the V-strut, with the airplane structure, and a nut at the upper end of the rear strut receiving said screw.

5. The combination of claim 1, the retracting means including a nut secured in the upper end of the rear strut, a screw threaded therein and extending upwardly and forwardly to a rigid, rotative connection to the airplane structure, said screw terminating at its forward end at a point above the pivot support of the V-strut an amount equal to the distance between such pivot support and the nut.

6. The combination of claim 1, the forward strut having incorporated therein a shock-absorbing unit, and the connections of the axle and struts permitting limited swinging thereof in upright transverse planes.

7. In combination with an airplane structure, a landing gear therefor comprising a rigid spacer bar at each side of the longitudinal axis pivotally supported at its forward end to the airplane structure to swing in a vertical longitudinal plane, a forward strut including a shock-absorbing unit, and pivotally connected at its upper end to the forward end of said spacer bar to oscillate about a longitudinal axis, a rear strut extending upwardly and rearwardly from the lower end of the forward strut, and pivotally connected at its upper end to the rear end of the spacer bar, to oscillate about a longitudinal axis coinciding with that of the front strut, a landing wheel at the lower ends of the struts, an axle supporting the wheel at each side and extending upwardly and inwardly towards the center line of the airplane structure, a pivot support for the inner end of the axle coinciding with the axis of swing of the spacer bar, and likewise permitting oscillation about a longitudinal axis, and a screw and nut device rigidly connecting the rear end of the spacer bar at all times with the airplane structure above the front end of the spacer bar, and operable to swing upward the rear end of the spacer bar to retract the landing gear.

8. In combination with an airplane structure, a landing gear therefor comprising a rigid spacer bar at each side of the longitudinal axis pivotally supported at its forward end to the airplane structure to swing in a vertical longitudinal plane, a forward strut including a shock-absorbing unit, and pivotally connected at its upper end to the forward end of said spacer bar to oscillate about a longitudinal axis, a rear strut extending upwardly and rearwardly from the lower end of the forward strut, and pivotally connected at its upper end to the rear end of the spacer bar, to oscillate about a longitudinal axis coinciding with that of the front strut, a landing wheel at the lower ends of the struts, an axle supporting the wheel at each side and extending upwardly and inwardly towards the center line of the airplane structure, a pivot support for the inner end of the axle coinciding with the axis of swing of the spacer bar, and likewise permitting oscillation about a longitudinal axis, a transverse shaft disposed above the front ends of each spacer bar, a nut secured in the rear end of each spacer bar, a screw threaded in each nut, and extending towards said shaft, means on said shaft for rotating each of said screws, and means operable from the pilot's compartment for rotating said shaft, thereby to swing the rear end of the spacer bar to retract the landing gear, or to project it.

9. In combination with an airplane structure, landing wheels, brakes associated therewith, means supporting said wheels from the airplane structure to move from operative position to a retracted position, and back, means for retracting and projecting said wheels, and means extending from the airplane structure to the brakes, and connected thereto for operation of the brakes in retracted positions as well as the fully projected position of the wheels.

10. In combination with an airplane structure, a landing gear therefor comprising landing wheels, struts supporting said wheels and pivotally supported from the airplane structure, means to project and retract said landing gear, brakes associated with the wheels, and mechanical means extending from the airplane structure to the brakes, connected thereto for operation of the brakes in retracted positions as well as the fully projected position of the landing gear.

11. In combination with an airplane structure, a landing gear therefor comprising landing wheels, brakes associated therewith, struts supporting said wheels and pivotally supported from the airplane structure upon a horizontal transverse axis, means to swing the landing gear in a vertical longitudinal plane to retract and project it, and mechanical means extending from the pilot's compartment to the brakes, and operatively connected thereto in all positions of the wheels, said brake-operating means including an articulated link, the joint in which is disposed in the pivot axis of the struts.

12. The combination of claim 11, the landing gear further including a split axle extending from the lower end of each strut upwardly and inwardly, and pivotally connected to the airplane structure along an axis coinciding with the pivot axis of the struts, the brake-operating means further including a brake rod extending alongside of the inclined inner end of each axle, means at its outer end operatively connected to the brake, a lever pivoted upon the inner end of each axle, one arm having the inner end of the brake rod secured thereto, its other arm being connected to an end of the articulated link referred to in claim 11, a second lever pivotally supported upon the airplane structure, and connected to the other end of the articulated link, and means extending from the second lever to the pilot's compartment, whereby to operate the brakes.

13. The combination of claim 11, the landing gear further including a split axle extending from the lower end of each strut upwardly and inwardly, and pivotally connected to the airplane structure for swinging upon an axis coinciding with the pivot axis of the struts, and also for limited swinging upon a horizontal axis at right angles thereto, the strut including a shock-absorbing means, and the brake-operating means further including a brake rod extending alongside of the inclined inner end of each axle, means at its outer end operatively connected to the brake, a lever pivoted upon the inner end of each axle, one arm having the inner end of the corresponding brake rod secured thereto, its other end being connected, close to the pivotal supports of the axle, to one end of the articulated link referred to in claim 11, a second lever pivotally supported upon the airplane structure, and connected to the other end of the articulated link, and means extending from the second lever to the pilot's compartment, whereby to operate the brakes.

14. The combination with an airplane wing spar, and a landing gear including landing wheels, struts, and axles supporting the same, and swingable about a horizontal transverse axis to retract or project the landing gear, and means to move said landing gear, of a separable frame supporting the struts, axles, and the operating means therefor, and means to secure said frame, with the associated parts assembled thereon, to the wing spar.

15. The combination with an airplane structure, of a landing gear including a longitudinal triangular member supported from the airplane structure to swing about a transverse horizontal axis in its upper forward portion, a landing wheel carried beneath such axis, and means bracing the upper rear portion of said triangular member from the airplane structure, and variable in effective length to swing the landing gear into and from retracted position, the airplane structure including an aerofoil recessed in its under side to receive the landing gear when retracted.

16. The combination with an airplane structure, of a landing gear including a longitudinal triangular member supported from the airplane structure to swing about a transverse horizontal axis in its upper forward portion, a landing wheel carried beneath such axis, and means bracing the upper rear portion of said triangular member from the airplane structure, and variable in effective length to swing the landing gear into and from retracted position, and a lateral brace means extending from the airplane structure downward and outward to the lower end of the triangular member, and pivotally connected to the airplane structure along a horizontal transverse axis.

17. In combination with an airplane structure, a landing wheel, wheel-supporting means pivotally supported from the airplane structure, and in operative position depending therefrom, said means including an outwardly directed shaft, upon the end of which the wheel is mounted, means inside of said wheel for bracing the first means longitudinally, means inside of the wheel for bracing the first means transversely, and pivotally supported from the airplane structure in the same pivot axis, and means for swinging said member and its braces upwardly, without disturbing their relative positions, to retract the wheel.

18. In combination with an airplane structure, a landing wheel at each side of the medial vertical plane of the airplane, means braced longitudinally, and supporting each wheel, pivotal supports for each of said means from the airplane structure, independent means for transversely bracing said wheel-supporting means, pivotal supports for each of said transverse bracing means, the several pivotal supports lying along a common axis, and means for swinging the wheel-supporting means and their bracing means upward to retract the wheels.

19. The combination with an airplane structure, of a landing wheel, a frame braced in a longitudinal direction, the members whereof bear a constant angular relationship to each other in all positions of the frame and landing wheel, and pivotally supported from the airplane structure to swing as a unit about a transverse horizontal axis, a shock absorbing unit included in said frame for supporting said landing wheel, means extending between the upper portion of said frame and the airplane structure to brace the frame, and means operable to swing said frame and the landing wheel supported thereby about the frame's pivot axis from and into retracted position.

20. The combination with an airplane structure, of a landing wheel, a triangular frame braced in a longitudinal plane, the members whereof bear a constant angular relationship to each other in all positions of the frame and landing wheels and pivotally supported in its upper portion from the airplane structure to swing about a transverse horizontal axis, one leg of said triangular frame comprising a shock absorbing unit, the same being disposed substantially in a radius of the pivot axis, the landing wheel being supported from said triangular frame through the shock absorber, and means to swing said frame as a unit about its pivot axis from and into retracted position.

21. The combination with an airplane structure, of a landing gear including a longitudinally braced frame comprising two parts symmetrically arranged on each side of a longitudinal center line, and supported from the airplane structure to swing as a unit about a transverse horizontal axis in its upper portion, said two parts of said frame being relatively movable transversely, means transversely bracing said frame from the airplane structure, a landing wheel carried by the lower portion of each part of the frame, and means supported from the airplane structure to swing said frame as a unit about its pivot axis from and into operative position.

22. The combination with an airplane structure, of a landing gear comprising a triangular longitudinally braced frame supported from the airplane structure to swing about a transverse horizontal axis in its upper portion, one of the legs of said frame comprising a shock absorbing unit, and certain of the frame elements being swingable transversely relative to another frame element to give effect to the shock absorber, means transversely bracing the frame from the airplane structure, a landing wheel supported from the shock absorber, and means supported from the airplane structure to swing said frame as a unit, with the associated wheel and transverse bracing means, about the frame's pivot axis from and into retracted position.

23. The combination with an airplane structure, of a landing gear comprising a longitudinally braced frame supported at its upper forward portion from the airplane structure to swing about a transverse axis, a vertical member depending from said frame, a landing wheel carried by its lower end, and means supported from the airplane structure to swing said frame and the landing wheel about the frame's pivot axis into and from retracted position.

24. The combination with an aerofoil recessed in its under side, of a landing gear comprising a longitudinally braced frame supported from the aerofoil to swing about a transverse axis in its upper forward portion, and disposed immediately above the lower surface of the aerofoil, a landing wheel carried by the lower portion of said frame, and means within the aerofoil bracing the frame from the aerofoil, and operable to swing the frame into retracted position within said recess, and therefrom into operative position wherein the entire wheel is projected below the lower surface of the airfoil.

25. In combination with an airplane structure, a landing gear therefor comprising a rigid spacer bar at each side of the longitudinal axis pivotally supported at its forward end to the airplane structure to swing in a vertical longitudinal plane, a forward strut including a shock-absorbing unit, and pivotally connected at its upper end to the forward end of said spacer bar to oscillate about a longitudinal axis, a rear strut extending upwardly and rearwardly from the lower end of the forward strut, and pivotally connected at its upper end to the rear end of the spacer bar, to oscillate about a longitudinal axis coinciding with that of the front strut, a landing wheel at the lower ends of the struts, an axle supporting the wheel at each side and extending upwardly and inwardly towards the center line of the airplane structure, a pivot support for the inner end of the axle coinciding with the axis of swing of the spacer bar, and likewise permitting oscillation about a longitudinal axis, and means supported from the airplane structure for swinging the spacer bar upward to retract the landing gear.

26. In combination with an airplane structure, a landing gear therefor comprising a rigid spacer bar at each side of the longitudinal axis pivotally supported at its forward end to the airplane structure to swing in a vertical longitudinal plane, a forward strut including a shock-absorbing unit, and pivotally connected at its upper end to the forward end of said spacer bar to oscillate about a longitudinal axis, a rear strut extending upwardly and rearwardly from the lower end of the forward strut, and pivotally connected at its upper end to the rear end of the spacer bar to oscillate about a longitudinal axis coinciding with that of the front strut, a landing wheel at the lower ends of the struts, an axle supporting the wheel at each side and extending upwardly and inwardly towards the center line of the airplane structure, a pivot support for the inner end of the axle coinciding with the axis of swing of the spacer bar, and likewise permitting oscillation about a longitudinal axis, and means bracing the rear end of the spacer bar from the airplane structure in all positions of the bar, and operable to swing the spacer bar upward to retract the landing gear.

27. In combination with an airplane structure, a retractable landing gear therefor including brakes associated with the wheels, means located upon the airplane structure to control application of the brakes, and mechanical means extending from said first means to the brakes upon the landing gear, and connected thereto for operation of the brakes in all positions of the landing gear.

28. In combination with an airplane structure, a retractable wheeled landing gear therefor including brakes associated with the wheels, means located upon the airplane structure to control application of the brakes, mechanical means extending thence to the brakes upon the landing gear, and means to retract and project the landing gear, without disturbing the setting or connection of the brakes and the brake-control means.

29. The combination with an airplane wing spar, a retractable landing gear, a frame whereon said landing gear is mounted for retraction and projection, means mounted upon said frame for accomplishing such movement of the landing gear, and means to secure said frame, with the associated parts assembled thereon, to the wing spar.

30. In combination with an airplane structure and a retractable landing gear pivotally supported thereon to swing in a fore-and-aft direction, and including a wheel supported substantially vertically beneath the pivot support in its operative position, and a member terminating rearwardly of the pivot support, a rigid compression member adjustable in effective length, and inclined from the rear end of said first member upwardly and forwardly to a point above the pivot support, and a third member at such point rigidly supporting said rigid second member from the airplane structure.

31. The combination of claim 30, the rigid second member comprising a screw and a nut receiving said screw, and means upon the airplane structure to secure and rotate said screw.

32. In combination with an airplane structure, a landing gear therefor comprising a rigid spacer bar at each side of the longitudinal axis pivotally supported at its forward end to the airplane structure to swing in a vertical longitudinal plane, a forward strut including a shock-absorbing unit, and pivotally connected at its upper end to the forward end of said spacer bar to oscillate about a longitudinal axis, a rear strut extending upwardly and rearwardly from the lower end of the forward strut, and pivotally connected at its upper end to the rear end of the spacer bar, to oscillate about a longitudinal axis coinciding with that of the front strut, a landing wheel at the lower ends of the struts, an axle supporting the wheel at each side and extending upwardly and inwardly towards the center line of the airplane structure, a pivot support for the inner end of the axle coinciding with the axis of swing of the spacer bar, and likewise permitting oscillation about a longitudinal axis, and means effecting a rigid non-reversible connection at all times between the rear end of the spacer bar and the airplane structure above the spacer bar, and operable to swing upward the rear end of the spacer bar to retract the landing gear.

33. The combination with an airplane structure, of a landing wheel, a landing gear including a triangular frame the parts whereof are braced in a longitudinal plane to maintain a constant angular relationship to each other in all positions of the frame and wheel, said frame being pivotally supported in its upper portion from the airplane structure to swing about a transverse axis, a shock absorber plunger received within and movable relative to one leg of said triangular frame, the landing wheel being supported on said plunger, and means to swing said frame and associated parts as a unit about its pivot axis from and into retracted position.

34. The combination with an airplane structure, of a two part landing gear, each of said parts carrying a wheel, and each comprising a triangular frame pivotally supported in its upper portion to swing as a unit, and including shock absorbing means associated with said frame and immediately connected to the wheel.

35. The combination with an airplane structure, of a two part landing gear, each of said parts carrying a wheel, and comprising an upright member, and a member inclined upwardly and rearwardly from the bottom thereof, spacer means to maintain the upper ends of said members in longitudinal spaced relation, pivot means securing said spacer means to the airplane structure to permit longitudinal swinging movement of said spacer means and said members with respect to the airplane structure, and additional pivot means to permit relative lateral swinging movement of said members transversely of said spacer means.

36. The combination with an airplane structure, of a retractable landing gear including a frame braced in a longitudinal direction and including a forward member which is vertical when the landing gear is in the projected position, a landing wheel supported from said frame, said frame being pivotally supported from the airplane structure at a point substantially vertically above the operative position of the landing wheel, to swing as a unit about a transverse axis, means bracing the upper portion of said frame from the airplane structure, and means operable to swing said frame about its pivot axis from and into retracted position.

37. The combination with an airplane structure, of a retractable landing gear comprising a triangular frame of which the forward member is substantially vertical when the landing gear is in operative position, said frame being supported from the airplane structure to swing about a transverse axis at the upper end of said forward member, a landing wheel carried by the lower end of the forward member, and compression means bracing the frame from the airplane structure in all positions thereof, and operable to swing the frame into and from retracted position.

38. The combination with an airplane structure, of a landing gear including a frame braced in a longitudinal direction and pivotally supported upon the airplane structure at a point substantially vertically above the operative position of the landing wheel, to swing as a unit about a transverse horizontal axis, a landing wheel supported from said frame, means to brace said frame laterally from the airplane structure, means bracing the upper portion of said frame from the airplane structure, and means operable to swing said frame about its pivot axis from and into retracted position.

ROBERT J. MINSHALL.